April 7, 1931.  N. G. SCHMITZ  1,800,108

FLYTRAP

Filed May 8 1928

Nicholas G. Schmitz
INVENTOR

BY Victor J. Evans
ATTORNEY

Patented Apr. 7, 1931

1,800,108

UNITED STATES PATENT OFFICE

NICHOLAS G. SCHMITZ, OF CHICAGO, ILLINOIS

FLYTRAP

Application filed May 8, 1928. Serial No. 276,127.

My invention relates to certain novel improvements in fly traps, and has for its principal object the provision of an improved construction of this character which will be highly efficient in use and economical in manufacture.

Among the several objects of the invention is to provide a fly trap adapted to be associated with the screen of a door or window whereby to trap flies and other insects that collect upon and about the screen.

A still further object of the invention is to provide a fly trap which may be expeditiously attached to a window or door screen and one which may be easily taken apart to remove the trapped flies or other insects therein.

Other objects will appear hereinafter.

The invention consists in the novel combination and arrangement of parts to be hereinafter described and claimed.

The invention will be best understood by reference to the accompanying drawing, wherein a preferred form of construction is shown and in which.

Figure 1:
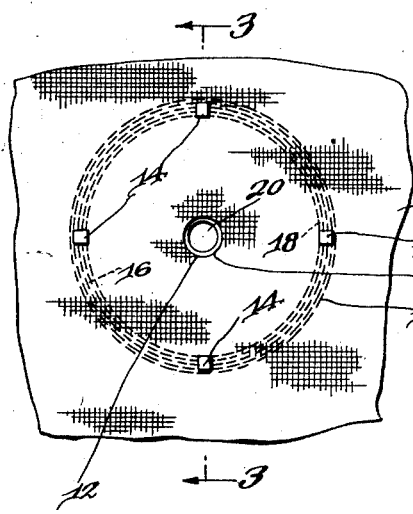
Fig. 1 is a fragmentary view of a door or window screen showing my improved trap associated therewith.
Figure 2:
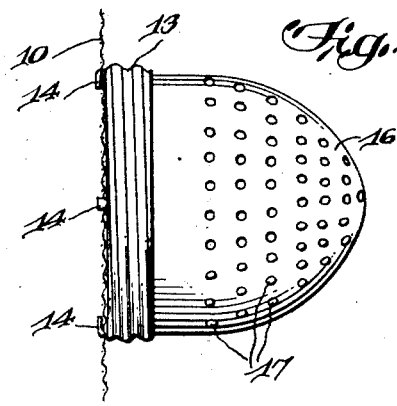
Fig. 2 is a side elevational view of the same.

Referring more particularly to the drawing, a door or window screen is indicated at 10 and this screen is provided with an opening 11, the edges of which may be re-inforced by a small gommet 12. With this screen I removably associate my improved fly trap which includes a thread bearing ring 13 having at its forward edge spaced prongs 14 which are adapted to penetrate through the screen 10 and be bent at right-angles with respect thereto to effect connection between the ring 13 and the screen. When this ring 13 is attached to the screen the opening 11 will be centrally located with respect thereto. Threaded into the ring 13 is the thread bearing end 15 of the cap 16 which provides together with the screen an enclosed container. This cap 16 is provided with a plurality of perforations 17 whereby to permit the entrance of light into the cap to attract the flies or other insects through the opening 11.

Threaded into the cap 16 at its thread bearing end 15 is a baffle 18 preferably formed substantially frustro-conical and likewise provided with a plurality of perforations 19. This baffle 18 is provided with a flanged opening 20 whereby the flies or other insects will pass into the cap 16.

It is preferably intended that the complete device be formed of such metal as will best serve the purpose and in use the operation of the device is as follows.

Operation

Figure 3:
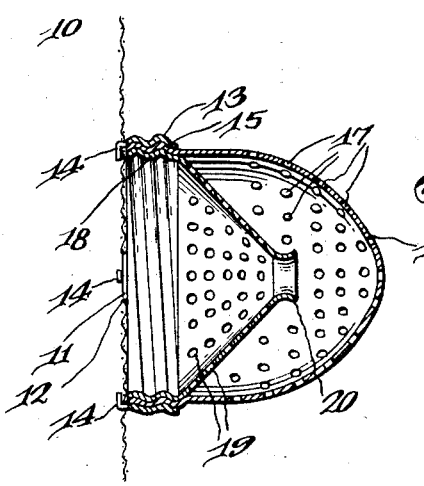
Fig. 3 is a sectional detail view taken substantially on line 3—3 of Figure 1.

After a number of flies or other insects have been trapped in the cap 16, the cap 16 together with the baffle 18 may be removed from the ring 13. The baffle 18 now may be removed from the cap 16 whereby to remove the flies trapped therein after the same have been killed by drowning or the like. After the removal of the flies or other insects the baffle is re-mounted in its position with respect to the cap 16 and the cap again threaded in the ring 13, as best shown in Figure 3.

While I have illustrated and described the preferred form of construction for carrying my invention into effect, this is capable of variation and modification without departing from the spirit of the invention. I, therefore, do not wish to be limited to the precise details of construction set forth herein, but desire to avail myself of such variations and modifications as come within the scope of the appended claim.

Having thus described the invention, what I claim as new and desire to protect by Letters Patent, is:

The combination with a reticulated member having an opening formed therein, a baffle having one end portion shaped to provide a restricted opening adapted to be disposed in substantial alignment with the first mentioned opening when said baffle is positioned with its opposite end portion abutting said reticulated member, a ring member having spaced projecting portions adapted to penetrate through said reticulated member and be bent at an angle to secure the ring member to said reticulated member, a cap enclosing said baffle and having an edge portion disposed between the edge portion of said baffle and said ring member, and means for connecting the ring member, the cap, and said baffle together.

In testimony whereof I affix my signature.

NICHOLAS G. SCHMITZ.